(12) United States Patent
Shen et al.

(10) Patent No.: US 11,910,264 B2
(45) Date of Patent: Feb. 20, 2024

(54) NETWORK RESELECTION METHOD AND APPARATUS

(71) Applicant: Huawei Technologies Co., Ltd., Shenzhen (CN)

(72) Inventors: Li Shen, Shenzhen (CN); Zhenrong Wei, Shenzhen (CN); Guanzhong Tan, Dongguan (CN); Jianhua Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 17/269,772

(22) PCT Filed: Aug. 21, 2019

(86) PCT No.: PCT/CN2019/101761
§ 371 (c)(1),
(2) Date: Feb. 19, 2021

(87) PCT Pub. No.: WO2020/038401
PCT Pub. Date: Feb. 27, 2020

(65) Prior Publication Data
US 2021/0321316 A1 Oct. 14, 2021

(30) Foreign Application Priority Data

Aug. 22, 2018 (CN) .......................... 201810961680.1
Dec. 14, 2018 (CN) .......................... 201811535711.3

(51) Int. Cl.
*H04W 4/00* (2018.01)
*H04W 36/32* (2009.01)
(Continued)

(52) U.S. Cl.
CPC ........... *H04W 36/32* (2013.01); *H04W 36/14* (2013.01); *H04W 48/18* (2013.01); *H04W 84/042* (2013.01)

(58) Field of Classification Search
CPC ..... H04W 36/32; H04W 36/14; H04W 48/18; H04W 84/042; H04W 4/023;
(Continued)

(56) References Cited

U.S. PATENT DOCUMENTS 5,899,957 A * 5/1999 Loomis .................... G01S 19/41
342/450
6,763,241 B2 * 7/2004 Gous ................... H04W 56/006
455/67.11
(Continued)

FOREIGN PATENT DOCUMENTS

CN 102469542 A 5/2012
CN 103648146 A 3/2014
(Continued)

*Primary Examiner* — Amancio Gonzalez
(74) *Attorney, Agent, or Firm* — Slater Matsil, LLP

(57) ABSTRACT

A method includes: obtaining a first geographical location in which UE is currently located; according to a correspondence between a geographical location and network information of a communications network, determining at least one second geographical location that, relative to the first geographical location, meets a preset proximity condition, and determining network information of at least one second communications network corresponding to each second geographical location; and performing network reselection processing based on at least the network information of the at least one second communications network corresponding to each second geographical location.

18 Claims, 4 Drawing Sheets

(51) Int. Cl.
*H04W 36/14* (2009.01)
*H04W 48/18* (2009.01)
*H04W 84/04* (2009.01)

(58) Field of Classification Search
CPC . H04W 48/16; H04W 48/20; H04W 52/0254; H04W 36/0055; H04W 36/30; H04W 52/0209; Y02D 30/70
USPC .......................................................... 370/329
See application file for complete search history.

(56) References Cited

U.S. PATENT DOCUMENTS

| | | | |
|---|---|---|---|
| 7,711,480 B2 * | 5/2010 | Robbins | G01C 21/28 701/476 |
| 7,978,667 B2 * | 7/2011 | Kalhan | H04W 64/00 455/439 |
| 8,193,978 B2 * | 6/2012 | Moshfeghi | G01S 19/22 342/357.44 |
| 8,233,433 B2 * | 7/2012 | Kalhan | H04W 48/12 370/328 |
| 8,515,446 B2 * | 8/2013 | Hupp | G01S 5/0289 455/456.6 |
| 8,559,958 B2 * | 10/2013 | Lee | H04W 36/32 455/438 |
| 8,606,293 B2 * | 12/2013 | Kim | G06Q 30/0261 455/418 |
| 8,676,226 B2 * | 3/2014 | Wu | H04W 60/00 370/352 |
| 8,718,014 B2 * | 5/2014 | Choi | H04W 36/0066 370/331 |
| 8,825,516 B2 * | 9/2014 | Grant | G06Q 10/08 705/28 |
| 8,874,113 B2 * | 10/2014 | Chin | H04W 76/50 455/436 |
| 8,879,502 B2 * | 11/2014 | Choi | H04W 36/0066 370/331 |
| 8,885,813 B2 * | 11/2014 | Vendrow | H04M 3/5125 379/266.01 |
| 8,983,443 B2 * | 3/2015 | Brisebois | H04W 4/60 455/418 |
| 9,402,195 B2 * | 7/2016 | Burley | H04W 24/02 |
| 9,807,250 B2 * | 10/2017 | Austin | H04M 15/8271 |
| 9,813,150 B1 * | 11/2017 | Bitra | H04B 10/116 |
| 9,918,264 B1 * | 3/2018 | Bitra | H04W 4/02 |
| 10,009,731 B2 * | 6/2018 | Zhao | H04L 67/55 |
| 10,083,608 B2 * | 9/2018 | O'Sullivan | G06Q 10/02 |
| 10,111,032 B2 * | 10/2018 | Vega | H04W 64/00 |
| 10,111,147 B1 * | 10/2018 | Prasad | H04W 36/245 |
| 10,223,429 B2 * | 3/2019 | Michel | G06F 16/22 |
| 10,229,434 B2 * | 3/2019 | Cheng | G06Q 30/0261 |
| 10,448,286 B2 * | 10/2019 | Hedberg | H04W 12/037 |
| 10,484,862 B2 * | 11/2019 | Chauhan | H04W 8/205 |
| 10,536,921 B1 * | 1/2020 | Govindassamy | H04W 64/003 |
| 10,567,905 B2 * | 2/2020 | Edge | G01S 5/10 |
| 10,571,547 B2 * | 2/2020 | Oh | G01S 5/0242 |
| 10,681,672 B2 * | 6/2020 | Kasirajan | H04W 8/02 |
| 10,684,350 B2 * | 6/2020 | Dupray | G01S 19/46 |
| 10,694,578 B2 * | 6/2020 | Radulescu | H04W 36/0058 |
| 10,708,834 B2 * | 7/2020 | Williammee | H04W 36/32 |
| 10,737,787 B2 * | 8/2020 | Morin | H04W 4/022 |
| 10,846,689 B2 * | 11/2020 | Matthews | G06Q 20/3276 |
| 10,911,990 B2 * | 2/2021 | Ying | H04W 36/0022 |
| 10,924,986 B2 * | 2/2021 | Fan | H04W 88/08 |
| 11,116,039 B2 * | 9/2021 | Li | H04W 80/02 |
| 11,157,941 B2 * | 10/2021 | Dey | H04W 4/02 |
| 11,172,467 B2 * | 11/2021 | Rubin | H04L 67/12 |
| 2002/0059453 A1 | 5/2002 | Eriksson et al. | |
| 2006/0111112 A1 * | 5/2006 | Maveddat | H04W 8/02 455/461 |
| 2008/0153509 A1 * | 6/2008 | Piekarski | H04W 64/00 455/456.2 |
| 2009/0121927 A1 * | 5/2009 | Moshfeghi | G01S 19/22 342/357.44 |
| 2010/0255836 A1 * | 10/2010 | Chen | H04W 48/20 455/426.1 |
| 2011/0009130 A1 * | 1/2011 | Wu | H04W 64/00 455/456.1 |
| 2011/0130138 A1 | 6/2011 | Lee et al. | |
| 2012/0108264 A1 * | 5/2012 | Martz | H04W 24/00 455/456.2 |
| 2012/0309417 A1 * | 12/2012 | Blom | H04W 4/023 455/456.1 |
| 2014/0235238 A1 * | 8/2014 | Pais | H04W 76/23 455/434 |
| 2015/0327132 A1 | 11/2015 | Shen et al. | |
| 2015/0382159 A1 * | 12/2015 | Kim | H04W 4/08 370/312 |
| 2016/0044479 A1 * | 2/2016 | Zhi | H04W 48/20 370/328 |
| 2016/0044546 A1 * | 2/2016 | Yang | H04W 36/32 370/331 |
| 2017/0134898 A1 * | 5/2017 | Vega | H04W 4/023 |
| 2018/0063738 A1 * | 3/2018 | Beluri | H04W 24/02 |
| 2019/0166453 A1 * | 5/2019 | Edge | G01S 5/06 |
| 2020/0151885 A1 * | 5/2020 | Yang | G01S 19/14 |
| 2021/0282077 A1 * | 9/2021 | Wei | H04W 48/18 |

FOREIGN PATENT DOCUMENTS

| | | |
|---|---|---|
| CN | 103686880 A | 3/2014 |
| CN | 105101081 A | 11/2015 |
| CN | 105554697 A | 5/2016 |
| CN | 105873145 A | 8/2016 |
| CN | 106028279 A | 10/2016 |
| CN | 106102130 A | 11/2016 |
| CN | 106714251 A | 5/2017 |
| WO | 2018030825 A1 | 2/2018 |

* cited by examiner

NETWORK RESELECTION METHOD AND APPARATUS

CROSS-REFERENCE TO RELATED APPLICATIONS

This application is a national stage of International Application No. PCT/CN2019/101761, filed on Aug. 21, 2019, which claims priority to Chinese Patent Application No. 201811535711.3, filed on Dec. 14, 2018, and Chinese Patent Application No. 201810961680.1, filed on Aug. 22, 2018. All of the aforementioned patent applications are hereby incorporated by reference in their entireties.

TECHNICAL FIELD

This application relates to the field of communications technologies, and in particular, to a network reselection method and an apparatus.

BACKGROUND

With development of communications technologies, user equipment (user equipment, UE) supports an increasing quantity of radio access technologies. To process different services, the UE usually needs to perform reselection between different communications networks. For example, the UE is currently located in a fourth generation (fourth generation, 4G) communications network, and when the UE needs to process a circuit switched fallback (circuit-switched fallback, CSFB) service or a single radio voice call continuity (Single Radio Voice Call Continuity, SRVCC) service, the UE needs to perform reselection and camp on a third generation (third generation, 3G) communications network from the currently located 4G communications network. After the UE completes the CSFB service or the SRVCC service, the UE needs to perform reselection and camp on the 4G communications network from the 3G communications network.

In the conventional technology, when performing reselection between different communications networks, UE needs to perform network search processing, to search for all surrounding communications networks. Then, the UE performs measurement processing on each found communications network, to determine whether each found communications network meets an access condition. Based on the conventional technology, when performing reselection between different communications networks, the UE needs to perform network search processing on all the surrounding communications networks, and measure all the found communications networks, resulting in comparatively low network reselection efficiency.

SUMMARY

Embodiments of this application provide a network reselection method and an apparatus, to improve network reselection efficiency. The technical solutions are in the following.

According to a first aspect, a network reselection method is provided, where the method includes:
  obtaining a first geographical location in which UE is currently located;
  according to a correspondence between a geographical location and network information of a communications network, determining at least one second geographical location that, relative to the first geographical location, meets a preset proximity condition (for example, within one kilometer near the first geographical location), and determining network information of at least one second communications network corresponding to each second geographical location, where the network information of a communications network includes one or more of a radio access technology and a cell identity; and
  performing network reselection processing based on at least the network information of the at least one second communications network corresponding to each second geographical location.

In this application, the first geographical location in which the UE is currently located is obtained. Then, according to the correspondence between a geographical location and network information of a communications network, the at least one second geographical location that, relative to the first geographical location, meets the preset proximity condition is determined, and the network information of the second communications network corresponding to each second geographical location is determined. After that, network reselection processing is performed based on at least the network information of the second communications network corresponding to each second geographical location. In this way, the UE does not need to perform network search processing on all surrounding communications networks, and does not need to measure all to-be-accessed communications networks either, thereby improving network reselection efficiency.

In a possible implementation, the obtaining a first geographical location in which UE is currently located includes:
  obtaining network information of a first communications network currently accessed by the UE; and
  determining, based on at least the network information of the first communications network, the first geographical location in which the UE is currently located.

In a possible implementation, the correspondence between a geographical location and network information of a communications network is stored in the UE, and the method further includes:
  if the at least one second geographical location that, relative to the first geographical location, meets the preset proximity condition cannot be determined according to the correspondence between a geographical location and network information of a communications network that is stored in the UE, sending a query request to a server, where the query request carries the first geographical location, so that according to a correspondence between a geographical location and network information of a communications network that is stored in the server, the server determines at least one third geographical location that, relative to the first geographical location, meets the preset proximity condition, and determines network information of at least one third communications network corresponding to each third geographical location; and
  receiving a query response sent by the server, where the query response carries the network information of the at least one third communications network corresponding to each third geographical location.

In a possible implementation, the performing network reselection processing based on at least the network information of the at least one second communications network corresponding to each second geographical location includes:
  selecting, from the at least one second communications network corresponding to each second geographical location, at least one fourth communications network that meets a condition, and performing network reselection processing based on network information of the at least one fourth communications network, where the condition is a condition that needs to be met by a communications network that the UE needs to perform reselection and camp on, and the condition is related to one or more of a radio access technology, a public land mobile network PLMN, and signal strength.

In a possible implementation, the selecting, from the at least one second communications network corresponding to each second geographical location, at least one fourth communications network that meets a condition, and performing network reselection processing based on network information of the at least one fourth communications network includes:

when the UE needs to perform reselection and camp on a communications network using a second radio access technology from a communications network using a first radio access technology, selecting at least one fourth communications network using the second radio access technology from the at least one second communications network corresponding to each second geographical location, and performing network reselection processing based on network information of the at least one fourth communications network.

In this application, when the UE needs to perform reselection and camp on the communications network using the second radio access technology from the communications network using the first radio access technology, the UE directly selects the fourth communications network using the second radio access technology from the at least one second communications network corresponding to each second geographical location. In this way, network reselection efficiency can be improved, and power consumption for measurement can be reduced.

In a possible implementation, the selecting, from the at least one second communications network corresponding to each second geographical location, at least one fourth communications network that meets a condition, and performing network reselection processing based on network information of the at least one fourth communications network includes:

if the UE is in a non-roaming state, selecting, from the at least one second communications network corresponding to each second geographical location, at least one fourth communications network that belongs to a PLMN to which the UE belongs, and performing network reselection processing based on network information of the at least one fourth communications network; or if the UE is in a roaming state, selecting, from the at least one second communications network corresponding to each second geographical location, at least one fourth communications network that belongs to a PLMN to which the UE subscribes, and performing network reselection processing based on network information of the at least one fourth communications network.

In this application, whether the UE is in the roaming state is determined. Then, based on that the UE is in the roaming state or the non-roaming state, the at least one fourth communications network of the corresponding PLMN is selected from the at least one second communications network corresponding to each second geographical location. In this way, the UE does not need to frequently perform search processing and measurement processing, thereby reducing power consumption of the UE.

In a possible implementation, the selecting, from the at least one second communications network corresponding to each second geographical location, at least one fourth communications network that meets a condition, and performing network reselection processing based on network information of the at least one fourth communications network includes:

when the UE needs to process an emergency call service, selecting a fourth communications network with highest signal strength from the at least one second communications network corresponding to each second geographical location, and performing reselection and camping on the fourth communications network to process the emergency call service.

In this application, when the UE needs to process the emergency call service, the UE selects the fourth communications network with the highest signal strength from the at least one second communications network corresponding to each second geographical location. In this way, it can be ensured that the emergency call service is properly processed.

According to a second aspect, an apparatus is provided, where the apparatus includes:

an obtaining module, configured to obtain a first geographical location in which UE is currently located;

a determining module, configured to: according to a correspondence between a geographical location and network information of a communications network, determine at least one second geographical location that, relative to the first geographical location, meets a preset proximity condition, and determine network information of at least one second communications network corresponding to each second geographical location, where the network information of a communications network includes at least one or more of a radio access technology and a cell identity; and a reselection module, configured to perform network reselection processing based on at least the network information of the at least one second communications network corresponding to each second geographical location.

In a possible implementation, the obtaining module is specifically configured to:

obtain network information of a first communications network currently accessed by the UE; and determine, based on at least the network information of the first communications network, the first geographical location in which the UE is currently located.

In a possible implementation, the correspondence between a geographical location and network information of a communications network is stored in the UE, and the apparatus further includes:

a sending module, configured to: if the at least one second geographical location that, relative to the first geographical location, meets the preset proximity condition cannot be determined according to the correspondence between a geographical location and network information of a communications network that is stored in the UE, send a query request to a server, where the query request carries the first geographical location, so that according to a correspondence between a geographical location and network information of a communications network that is stored in the server, the server determines at least one third geographical location that, relative to the first geographical location, meets the preset proximity condition, and determines network information of at least one third communications network corresponding to each third geographical location; and a receiving module, configured to receive a query response sent by the server, where the query response carries the network information of the at least one third communications network corresponding to each third geographical location.

In a possible implementation, the reselection module is specifically configured to:

select, from the at least one second communications network corresponding to each second geographical location, at least one fourth communications network that meets a condition, and perform network reselection processing based on network information of the at least one fourth communications network, where the condition is a condition that needs to be met by a communications network that the UE needs to perform reselection and camp on, and the condition is related to one or more of a radio access technology, a public land mobile network PLMN, and signal strength.

In a possible implementation, the reselection module is specifically configured to:

when the UE needs to perform reselection and camp on a communications network using a second radio access technology from a communications network using a first radio access technology, select at least one fourth communications network using the second radio access technology from the at least one second communications network corresponding to each second geographical location, and perform network reselection processing based on network information of the at least one fourth communications network.

In a possible implementation, the reselection module is specifically configured to:

if the UE is in a non-roaming state, select, from the at least one second communications network corresponding to each second geographical location, at least one fourth communications network that belongs to a PLMN to which the UE belongs, and perform network reselection processing based on network information of the at least one fourth communications network; or if the UE is in a roaming state, select, from the at least one second communications network corresponding to each second geographical location, at least one fourth communications network that belongs to a PLMN to which the UE subscribes, and perform network reselection processing based on network information of the at least one fourth communications network.

In a possible implementation, the reselection module is specifically configured to:

when the UE needs to process an emergency call service, select a fourth communications network with highest signal strength from the at least one second communications network corresponding to each second geographical location, and perform reselection and camp on the fourth communications network to process the emergency call service.

According to a third aspect, user equipment UE is provided, where the UE includes one or more memories, one or more processors, one or more modems, and one or more radio frequency transceivers, where the one or more memories are configured to store a program instruction; and the one or more processors are configured to execute the program instruction stored in the one or more memories to enable the UE to perform the following operations:

obtaining a first geographical location in which the UE is currently located;

according to a correspondence between a geographical location and network information of a communications network, determining at least one second geographical location that, relative to the first geographical location, meets a preset proximity condition, and determining network information of at least one second communications network corresponding to each second geographical location, where the network information of a communications network includes one or more of a radio access technology and a cell identity; and controlling, by using the one or more modems, the one or more radio frequency transceivers to perform network reselection processing based on at least the network information of the at least one second communications network corresponding to each second geographical location.

In a possible implementation, the operation of obtaining a first geographical location in which the UE is currently located includes:

obtaining, by using the one or more modems, network information of a first communications network currently accessed by the UE; and determining, based on at least the network information of the first communications network, the first geographical location in which the UE is currently located.

In a possible implementation, the correspondence between a geographical location and network information of a communications network is stored in the one or more memories of the UE, and the operation further includes:

if the at least one second geographical location that, relative to the first geographical location, meets the preset proximity condition cannot be determined according to the correspondence between a geographical location and network information of a communications network that is stored in the UE, controlling, by using the one or more modems, the one or more radio frequency transceivers to send a query request to a server, where the query request carries the first geographical location, so that according to a correspondence between a geographical location and network information of a communications network that is stored in the server, the server determines at least one third geographical location that, relative to the first geographical location, meets the preset proximity condition, and determines network information of at least one third communications network corresponding to each third geographical location; and controlling, by using the one or more modems, the one or more radio frequency transceivers to receive a query response sent by the server, where the query response carries the network information of the at least one third communications network corresponding to each third geographical location.

In a possible implementation, the operation of controlling, by using the one or more modems, the one or more radio frequency transceivers to perform network reselection processing based on at least the network information of the at least one second communications network corresponding to each second geographical location includes:

selecting, from the at least one second communications network corresponding to each second geographical location, at least one fourth communications network that meets a condition, and controlling, by using the one or more modems, the one or more radio frequency transceivers to perform network reselection processing based on network information of the at least one fourth communications network, where the condition is a condition that needs to be met by a communications network that the UE needs to perform reselection and camp on, and the condition is related to one or more of a radio access technology, a public land mobile network PLMN, and signal strength.

In a possible implementation, the operation of selecting, from the at least one second communications network corresponding to each second geographical location, at least one fourth communications network that meets a condition, and controlling, by using the one or more modems, the one or more radio frequency transceivers to perform network reselection processing based on network information of the at least one fourth communications network includes:

when the UE needs to perform reselection and camp on a communications network using a second radio access technology from a communications network using a first radio access technology, selecting at least one fourth communications network using the second radio access technology from the at least one second communications network corresponding to each second geographical location, and controlling, by using the one or more modems, the one or more radio frequency transceivers to perform network reselection processing based on network information of the at least one fourth communications network.

In a possible implementation, the operation of selecting, from the at least one second communications network corresponding to each second geographical location, at least one fourth communications network that meets a condition, and controlling, by using the one or more modems, the one or more radio frequency transceivers to perform network reselection processing based on network information of the at least one fourth communications network includes:

if the UE is in a non-roaming state, selecting, from the at least one second communications network corresponding to each second geographical location, at least one fourth communications network that belongs to a PLMN to which the UE belongs, and controlling, by using the one or more modems, the one or more radio frequency transceivers to perform network reselection processing based on network information of the at least one fourth communications network; or if the UE is in a roaming state, selecting, from the at least one second communications network corresponding to each second geographical location, at least one fourth communications network that belongs to a PLMN to which the UE subscribes, and controlling, by using the one or more modems, the one or more radio frequency transceivers to perform network reselection processing based on network information of the at least one fourth communications network.

In a possible implementation, the operation of selecting, from the at least one second communications network corresponding to each second geographical location, at least one fourth communications network that meets a condition, and controlling, by using the one or more modems, the one or more radio frequency transceivers to perform network reselection processing based on network information of the at least one fourth communications network includes:

when the UE needs to process an emergency call service, selecting a fourth communications network with highest signal strength from the at least one second communications network corresponding to each second geographical location, and controlling, by using the one or more modems, the one or more radio frequency transceivers to perform reselection and camp on the fourth communications network to process the emergency call service.

According to a fourth aspect, a computer readable storage medium is provided, including an instruction. When the instruction is run on a computer, the computer is enabled to perform any method according to the first aspect.

According to a fifth aspect, a user terminal is provided, where the user terminal includes one or more processors, one or more memories, one or more modems, and one or more radio frequency transceivers, where the one or more memories are configured to store a program instruction; and the one or more processors are configured to control the one or more modems and the one or more radio frequency transceivers according to the program instruction stored in the one or more memories, to enable the user terminal to perform any method according to the first aspect.

According to a sixth aspect, a user terminal is provided, where the terminal includes one or more processors, one or more memories, and one or more transceivers, where the one or more transceivers are configured to receive and send data;

the one or more memories are configured to store an instruction; and the one or more processors are configured to invoke and execute the instruction in the one or more memories, to enable the user terminal to perform any method according to the first aspect.

According to a seventh aspect, an apparatus is provided and is used in a user terminal, where the apparatus is coupled to a memory, and is configured to read and execute an instruction stored in the memory, to enable the user terminal to implement any method according to the first aspect; and the memory may be integrated into a processor, or may be independent of a processor.

According to an eighth aspect, the apparatus according to the seventh aspect is provided, where the apparatus is a chip (for example, a system on a chip SoC (System on a Chip)) of the user terminal.

In this application, the first geographical location in which the UE is currently located is obtained. Then, according to the correspondence between a geographical location and network information of a communications network, the at least one second geographical location that, relative to the first geographical location, meets the preset proximity condition is determined, and the network information of the second communications network corresponding to each second geographical location is determined. After that, network reselection processing is performed based on at least the network information of the second communications network corresponding to each second geographical location. In this way, the UE does not need to perform network search processing on all surrounding communications networks, and does not need to measure all to-be-accessed communications networks either, thereby improving network reselection efficiency.

DETAILED DESCRIPTION OF ILLUSTRATIVE EMBODIMENTS

Figure 1:
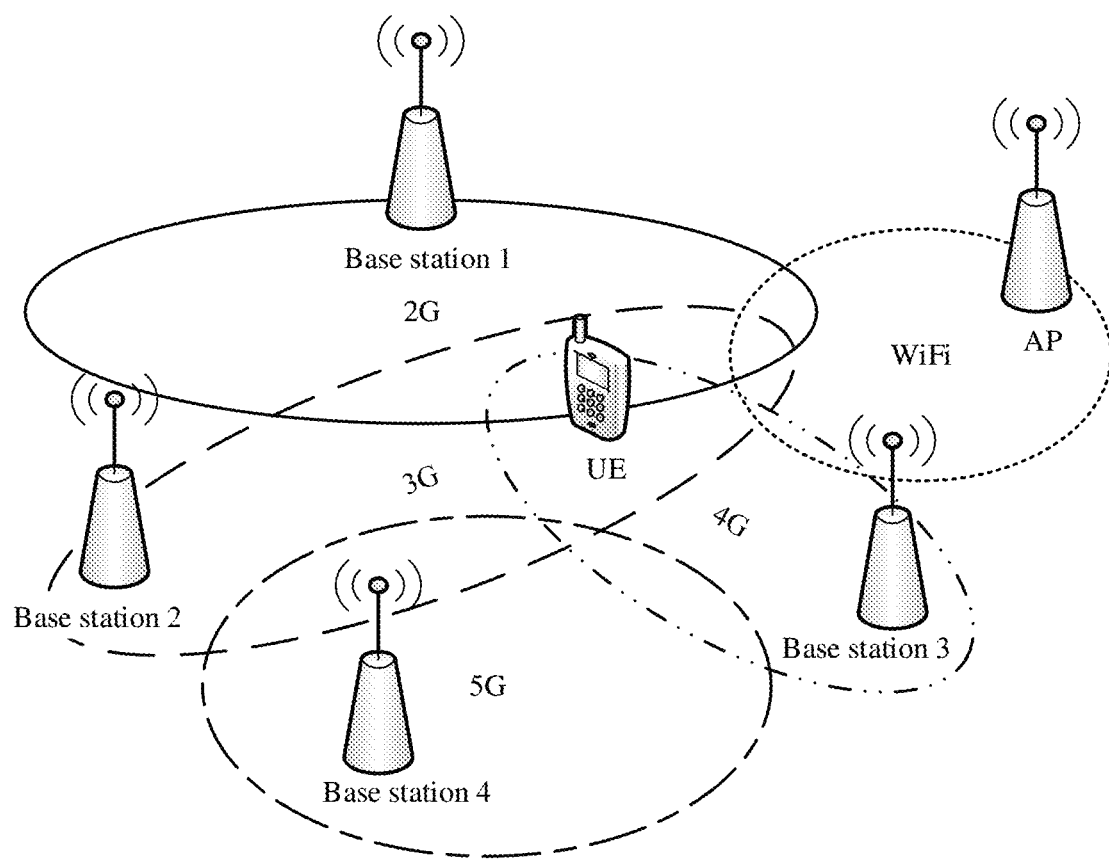
FIG. 1 is a diagram of an example of a network system according to an embodiment of this application.

The embodiments of this application provide a network reselection method. The method may be used in a network reselection scenario. FIG. 1 is a diagram of an example of a network system according to an embodiment of this application. The network system includes a base station 1, a base station 2, a base station 3, a base station 4, and a wireless access point (wireless access point, AP). The base station 1 provides a second generation (second generation, 2G) communications network for UE, the base station 2 provides a 3G communications network for the UE, the base station 3 provides a 4G communications network for the UE, the base station 4 provides a fifth generation (fifth generation, 5G) communications network for the UE, and the AP provides a wireless access communications network for the UE.

To process different services, the UE usually needs to perform reselection between different communications networks. For example, the UE is currently located in the 4G communications network. When the UE needs to process a CSFB service or an SRVCC service, the UE needs to perform reselection and camp on the 2G communications network or the 3G communications network from the currently located 4G communications network. Later, after the UE completes the CSFB service or the SRVCC service, the UE may perform reselection and camp on the 4G communications network from the currently located 2G communications network or 3G communications network. For another example, the UE is currently located in the 5G communications network. When the UE processes the SRVCC service, the UE needs to perform reselection and camp on the 2G communications network or the 3G communications network from the currently located 5G communications network. Later, after the UE completes the SRVCC service, the UE may perform reselection and camp on the 5G communications network through a high-priority background search; or the UE may perform reselection and camp on the 4G communications network from the currently located 2G communications network or 3G communications network, and then, the UE further performs reselection and camps on the 5G communications network from the 4G communications network.

Currently, the UE mainly implements reselection between different communications networks in the following several manners. In this embodiment of this application, an example in which the UE performs reselection and camps on the 4G communications network from the 3G communications network is used for description. Other cases are similar. Manner 1: The 4G communications network proactively initiates redirection. Manner 2: When the 4G communications network does not proactively initiate redirection, the UE performs reselection based on prestored network information of the 4G communications network. Manner 3: If the UE cannot perform reselection and camp on the 4G communications network based on the prestored network information of the 4G communications network, the UE performs reselection based on prestored network information of another communications network adjacent to the 4G communications network. Manner 4: If the UE has not prestored the network information of the another communications network adjacent to the 4G communications network, the UE performs reselection and camps on the 4G network through autonomous reselection.

However, the reselection manners currently used by the UE have the following problems. Problem 1: A person skilled in the art needs to perform redirection configuration for different communications networks in advance. Problem 2: The UE cannot learn of network information of a communications network around a geographical location in which the UE is currently located. Therefore, reselection needs to be performed on all communications networks around the geographical location in which the UE is currently located, resulting in comparatively low network reselection efficiency.

Figure 2:
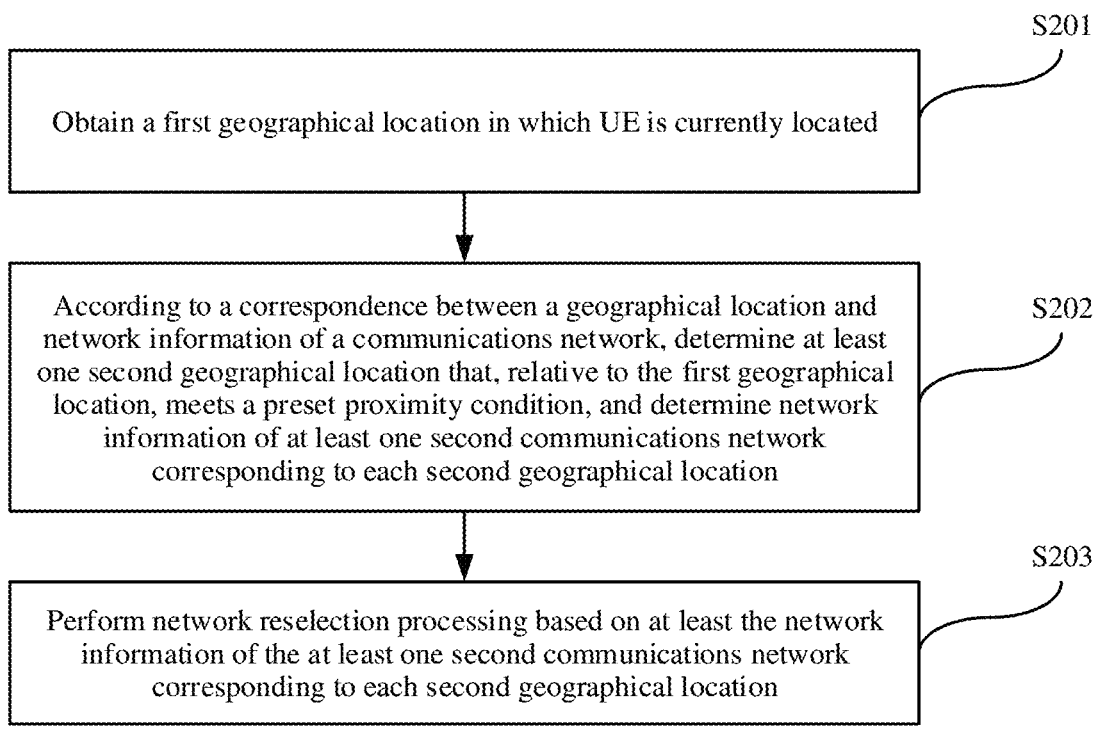
FIG. 2 is a flowchart of a network reselection method according to an embodiment of this application.

For the foregoing problems, an embodiment of this application provides a network reselection method that can improve network reselection efficiency. As shown in FIG. 2, a specific processing procedure is in the following.

Step 201: Obtain a first geographical location in which UE is currently located.

In implementation, when the UE needs to perform reselection and camp on another communications network from a currently accessed communications network, the UE may obtain the first geographical location currently located. As shown in Table 1, geographical location may include longitude information (lat), dimension information (lon), and estimation precision information (accuracy). The geographical location may further include speed information (speed) and azimuth information (Bearing). It should be noted that the geographical location may further include other information. This is not limited in this embodiment of this application.

TABLE 1

| No. | Geographical Location Information |
|---|---|
| 1 | Longitude information |
| 2 | Dimension information |
| 3 | Estimation precision information |
| 4 | Speed information (optional) |
| 5 | Azimuth information (optional) |

The UE may obtain, in various manners, the first geographical location currently located. The UE may obtain the first geographical location currently located by using a pre-installed global positioning system (global positioning system, GPS) apparatus, or may determine the first geographical location currently located by using network information of a second communications network currently accessed. A processing process in which the UE determines the first geographical location currently located by using the network information of the second communications network currently accessed is in the following.

Step 1: Obtain network information of a first communications network currently accessed.

In implementation, when the UE needs to obtain the first geographical location currently located, the UE may obtain the network information of the first communications network currently accessed. The first communications network may be one or more of a Wi-Fi communications network and a mobile communications network. The first communications network may further include another type of communications network. This is not limited in this embodiment of this application. Table 2 provides network information of the Wi-Fi communications network. The network information of the Wi-Fi communications network may include a media access control (media access control, MAC) address of an AP, a received signal strength indication (received signal strength indication, RSSI), a boot time (boot time) of an AP, and a center frequency (frequency). It should be noted that the network information of the Wi-Fi communications network may further include other information. This is not limited in this embodiment of this application.

TABLE 2

| No. | Network Information |
|---|---|
| 1 | MAC address of an AP |
| 2 | Received signal strength indication |
| 3 | Boot time of an AP |
| 4 | Center frequency |

Table 3 provides network information of the mobile communications network. The network information of the mobile communications network may include network information of a primary cell and network information of a neighboring cell. The network information of a primary cell may include a boot time of a base station, a mobile country code (mobile country code, MCC), a mobile network code (mobile network code, MNC), a local area code (local area code, LAC), a cell identity (cell identification, a CellID), an RSSI, a radio access technology (radio access technology, RAT), a channel number (channelnumber), a beam identity of a millimeter wave (mmwavebeaming form ID), an RSSI of a millimeter wave, a channel number of a secondary cell, and an RSSI of a secondary cell. The network information of a neighboring cell may include a channel number, a physical identity (physical identity), and an RSSI. It should be noted that the network information of the mobile communications network may further include other information. This is not limited in this embodiment of this application.

TABLE 3

| Cell Type | No. | Network Information |
|---|---|---|
| Primary cell | 1 | Boot time of a base station |
| | 2 | Mobile country code |
| | 3 | Mobile network code |
| | 4 | Local area code |
| | 5 | Cell identity |
| | 6 | Received signal strength indication |
| | 7 | Radio access technology |
| | 8 | Beam identity of a millimeter wave |
| | 9 | RSSI of a millimeter wave |
| | 10 | Channel number of a secondary cell |
| | 11 | RSSI of a secondary cell |
| Neighboring cell | 1 | Channel number |
| | 2 | Physical identity |
| | 3 | Received signal strength indication |

Step 2: Determine, based on at least the network information of the first communications network, the first geographical location in which the UE is currently located.

In implementation, after obtaining the network information of the first communications network, the UE may determine, based on the network information of the first communications network, the first geographical location currently located. For example, the UE may determine a geographical location of a base station based on a cell identity. Then, the UE determines, based on the location of the base station and other information (for example, information such as an RSSI, a beam identity of a millimeter wave, and an RSSI of a millimeter wave), the first geographical location currently located. Alternatively, the UE may determine a geographical location of an AP based on a MAC address of the AP. Then, the UE determines, based on the geographical location of the AP and other information (for example, information such as an RSSI and a center frequency), the first geographical location currently located.

Step 202: According to a correspondence between a geographical location and network information of a communications network, determine at least one second geographical location that, relative to the first geographical location, meets a preset proximity condition, and determine network information of at least one second communications network corresponding to each second geographical location.

The network information of a communications network may include one or more of a radio access technology and a cell identity.

In implementation, the correspondence between a geographical location and network information of a communications network may be stored in the UE or on a server. The correspondence may be set by a person skilled in the art, and may further be updated by other UE. After the UE determines the first geographical location currently located, according to the correspondence between a geographical location and network information of a communications network, the UE may determine the at least one second geographical location that, relative to the first geographical location, meets the preset proximity condition, and determine the network information of the second communications network corresponding to each second geographical location. The second communications network may include all communications networks corresponding to the second geographical location, or may include a communications network that uses a radio access technology and that is corresponding to the second geographical location, or may include a communications network that is of a PLMN and that is corresponding to the second geographical location. In addition, the preset proximity condition may be that a distance from the first geographical location meets a preset distance. For example, after the UE determines the first geographical location currently located, according to the correspondence between a geographical location and network information of a communications network, the UE may determine at least one second geographical location that is within a range of 10 kilometers from the first geographical location, and determine network information of a communications network (that is, the second communications network) corresponding to each second geographical location.

As shown in Table 4, the network information of the second communications network may include an MCC, an MNC, an LAC, a CellID, an RSSI, an RAT, and a channel number. It should be noted that the network information of the second communications network may further include other information. This is not limited in this embodiment of this application.

TABLE 4

| Cell No. | No. | Network Information |
|---|---|---|
| Cell 1 | 1 | Mobile country code |
| | 2 | Mobile network code |
| | 3 | Local area code |
| | 4 | Cell identity |
| | 5 | Received signal strength indication |
| | 6 | Radio access technology |
| | 7 | Channel number |
| Cell 2 | 1 | Mobile country code |
| | 2 | Mobile network code |
| | 3 | Local area code |

TABLE 4-continued

| Cell No. | No. | Network Information |
|---|---|---|
| | 4 | Cell identity |
| | 5 | Received signal strength indication |
| | 6 | Radio access technology |
| | 7 | Channel number |
| Cell n | ... | ... |

In a possible implementation, the correspondence between a geographical location and network information of a communications network may be stored in the UE. If the UE cannot determine network information of a target communications network according to the correspondence between a geographical location and network information of a communications network that is stored in the UE, the UE may query the server. A specific processing process is in the following.

Step 1: If the at least one second geographical location that, relative to the first geographical location, meets the preset proximity condition cannot be determined according to the correspondence between a geographical location and network information of a communications network that is stored in the UE, send a query request to the server, where the query request carries the first geographical location, so that according to the correspondence between a geographical location and network information of a communications network that is stored in the server, the server determines at least one third geographical location that, relative to the first geographical location, meets the preset proximity condition, and determines network information of at least one third communications network corresponding to each third geographical location.

In implementation, if the UE cannot determine, according to the correspondence between a geographical location and network information of a communications network that is stored in the UE, the at least one second geographical location that, relative to the first geographical location, meets the preset proximity condition (that is, cannot determine the network information of the second communications network), the UE may send the query request to the server. The query request carries the first geographical location. After the server receives the query request sent by the UE, according to the correspondence between a geographical location and network information of a communications network that is stored in the server, the server may determine the at least one third geographical location that, relative to the first geographical location, meets the preset proximity condition, and determine the network information of the at least one third communications network corresponding to each third geographical location. The processing process in which, according to the correspondence between a geographical location and network information of a communications network that is stored in the server, the server determines the at least one third geographical location that, relative to the first geographical location, meets the preset proximity condition, and determines the network information of the at least one third communications network corresponding to each third geographical location is similar to the processing process in step 202, and details are not described herein. After the server determines the network information of the at least one third communications network corresponding to each third geographical location, the server may send a query response to the UE. The query response carries the network information of the at least one third communications network corresponding to each third geographical location.

Step 2: Receive the query response sent by the server, where the query response carries the network information of the at least one third communications network corresponding to each third geographical location.

In implementation, after receiving the query response sent by the server, the UE may parse the query response to obtain the network information of the at least one third communications network corresponding to each third geographical location.

Step 203: Perform network reselection processing based on at least the network information of the at least one second communications network corresponding to each second geographical location.

In implementation, after obtaining the network information of the at least one second communications network corresponding to each second geographical location, the UE may perform network reselection processing based on the network information of each second communications network.

Optionally, the UE may select at least one fourth communications network of a target network type from the at least one second communications network corresponding to each second geographical location, and perform network reselection processing based on network information of the at least one fourth communications network.

The target network type includes at least one or more of a radio access technology, a public land mobile network PLMN, and signal strength.

In implementation, after determining the at least one second communications network corresponding to each second geographical location, the UE may further select, based on the target network type and from the at least one second communications network corresponding to each second geographical location, the at least one fourth communications network of the target network type. Then, the UE may perform network reselection processing based on the network information of the at least one fourth communications network. In this way, a quantity of second communications networks may further be reduced for the UE, to improve network reselection efficiency.

For different application scenarios, there are also different processing processes in which the UE selects the at least one fourth communications network of the target network type from the at least one second communications network corresponding to each second geographical location, and performs network reselection processing based on the network information of the at least one fourth communications network. This embodiment of this application provides several application scenarios. Details are in the following.

Application scenario 1: When the UE needs to perform reselection and camp on a communications network using a second radio access technology from a communications network using a first radio access technology, the UE selects at least one fourth communications network using the second radio access technology from the at least one second communications network corresponding to each second geographical location, and performs network reselection processing based on network information of the at least one fourth communications network.

In implementation, when the UE needs to perform reselection and camp on the communications network using the second radio access technology from the communications network using the first radio access technology, the UE may select the at least one fourth communications network using the second radio access technology from the at least one second communications network corresponding to each second geographical location, and perform network reselection processing based on the network information of the at least one fourth communications network. Therefore, network reselection efficiency is improved, and power consumption for measurement is reduced. For example, the at least one second communications network corresponding to each second geographical location includes a 2G communications network, a 3G communications network, a 4G communications network, and a 5G communications network. When the UE needs to perform reselection and camp on the 4G communications network (that is, the communications network using the second radio access technology) from the currently located 3G communications network (that is, the communications network using the first radio access technology), the UE may select at least one 4G communications network from the at least one second communications network corresponding to each second geographical location. Then, network search processing and measurement processing are performed based on network information of the 4G communications network. If the 4G communications network meets an access requirement of the UE, the UE may access the 4G communications network. In this way, the UE does not need to perform network search processing and measurement processing on surrounding 2G communications networks, 3G communications networks, and 5G communications networks, thereby improving network reselection efficiency and reducing power consumption for measurement.

Application scenario 2: Whether the UE is in a roaming state is determined. If the UE is in a non-roaming state, the UE selects, from the at least one second communications network corresponding to each second geographical location, at least one fourth communications network that belongs to a PLMN to which the UE belongs, and performs network reselection processing based on network information of the at least one fourth communications network. If the UE is in the roaming state, the UE selects, from the at least one second communications network corresponding to each second geographical location, at least one fourth communications network that belongs to a PLMN to which the UE subscribes, and performs network reselection processing based on network information of the at least one fourth communications network.

In implementation, the UE may determine whether the UE is in the roaming state. If the UE is in the non-roaming state, the UE may select, from the at least one second communications network corresponding to each second geographical location, the at least one fourth communications network that belongs to the PLMN to which the UE belongs, and perform network reselection processing based on the network information of the at least one fourth communications network. If the UE is in the roaming state, the UE may select, from the at least one second communications network corresponding to each second geographical location, the at least one fourth communications network that belongs to the PLMN to which the UE subscribes, and perform network reselection processing based on the network information of the at least one fourth communications network. If the at least one fourth communications network that belongs to the PLMN of the target network type does not exist in the at least one second communications network corresponding to each second geographical location, the UE remains in a sleep state or increases a network search interval, thereby reducing power consumption of the UE.

For example, the at least one second communications network corresponding to each second geographical location includes a 2G communications network, a 3G communications network, and a 4G communications network that belong to the PLMN to which the UE belongs, and further includes a 2G communications network, a 3G communications network, and a 4G communications network that belong to the PLMN to which the UE subscribes, and the UE is in the non-roaming state. In this case, the UE may select the 2G communications network, the 3G communications network, and the 4G communications network (that is, the at least one fourth communications network) that belong to the PLMN to which the UE belongs. In this way, the UE may perform network search processing and measurement processing based on network information of the 2G communications network, the 3G communications network, and the 4G communications network that belong to the PLMN to which the UE belongs, thereby improving network reselection efficiency and reducing power consumption for measurement.

For another example, the at least one second communications network corresponding to each second geographical location includes a communications network that belongs to the PLMN to which the UE subscribes, and the UE is in the non-roaming state. In this case, if a communications network that belongs to the PLMN to which the UE belongs does not exist in the at least one second communications network corresponding to each second geographical location, the UE remains in the sleep state or increases the network search interval. In this way, the UE does not need to frequently perform search processing and measurement processing, thereby reducing power consumption of the UE.

Application scenario 3: When the UE needs to process an emergency call service, the UE selects a fourth communications network with highest signal strength from the at least one second communications network corresponding to each second geographical location, and performs reselection and camps on the fourth communications network to process the emergency call service.

In implementation, when the UE needs to process the emergency call service, the UE may select the fourth communications network with the highest signal strength (that is, an RSSI) from the at least one second communications network corresponding to each second geographical location, and perform reselection and camp on the fourth communications network to process the emergency call service. In this way, it can be ensured that the emergency call service is properly processed. For example, the at least one second communications network corresponding to each second geographical location includes a 2G communications network, a 3G communications network, and a 4G communications network. An RSSI of the 2G communications network is −75 dbm, an RSSI of the 3G communications network is −95 dbm, and an RSSI of the 4G communications network is −110 dbm. When the UE needs to process an emergency call service, the UE may select the fourth communications network with the highest signal strength from the at least one second communications network corresponding to each second geographical location. Then, the UE may perform reselection and camp on the 4G communications network to process the emergency call service. In this way, it can be ensured that the emergency call service is properly processed.

In a possible implementation, if a communications network that meets an access condition does not exist in the at least one second communications network corresponding to each second geographical location, or the UE cannot determine, according to the correspondence between a geographical location and network information of a communications network that is stored in either the UE or the server, the at least one second geographical location that, relative to the first geographical location, meets the preset proximity condition, autonomous network reselection processing is performed based on a preset network search interval.

In implementation, if the communications network that meets the access condition does not exist in the at least one second communications network corresponding to each second geographical location, or the UE cannot determine, according to the correspondence between a geographical location and network information of a communications network that is stored in the UE and in the server, the at least one second geographical location that, relative to the first geographical location, meets the preset proximity condition (that is, cannot determine the second communications network), the UE performs autonomous network reselection processing based on the preset network search interval.

In a possible implementation, if the UE determines, through autonomous network reselection processing, a fifth communications network to be accessed, the UE performs reselection and camps on the fifth communications network, and adds a correspondence between the first geographical location and network information of the fifth communications network to the correspondence between a geographical location and network information of a communications network.

In implementation, if the UE determines, through autonomous network reselection processing, the fifth communications network to be accessed, the UE may perform reselection and camp on the fifth communications network. In addition, the UE may add the correspondence between the first geographical location and the network information of the fifth communications network to the correspondence between a geographical location and network information of a communications network. Later, if the UE needs to perform reselection and camp on the fifth communications network, the UE may directly perform network reselection processing based on the network information of the fifth communications network.

Figure 3:
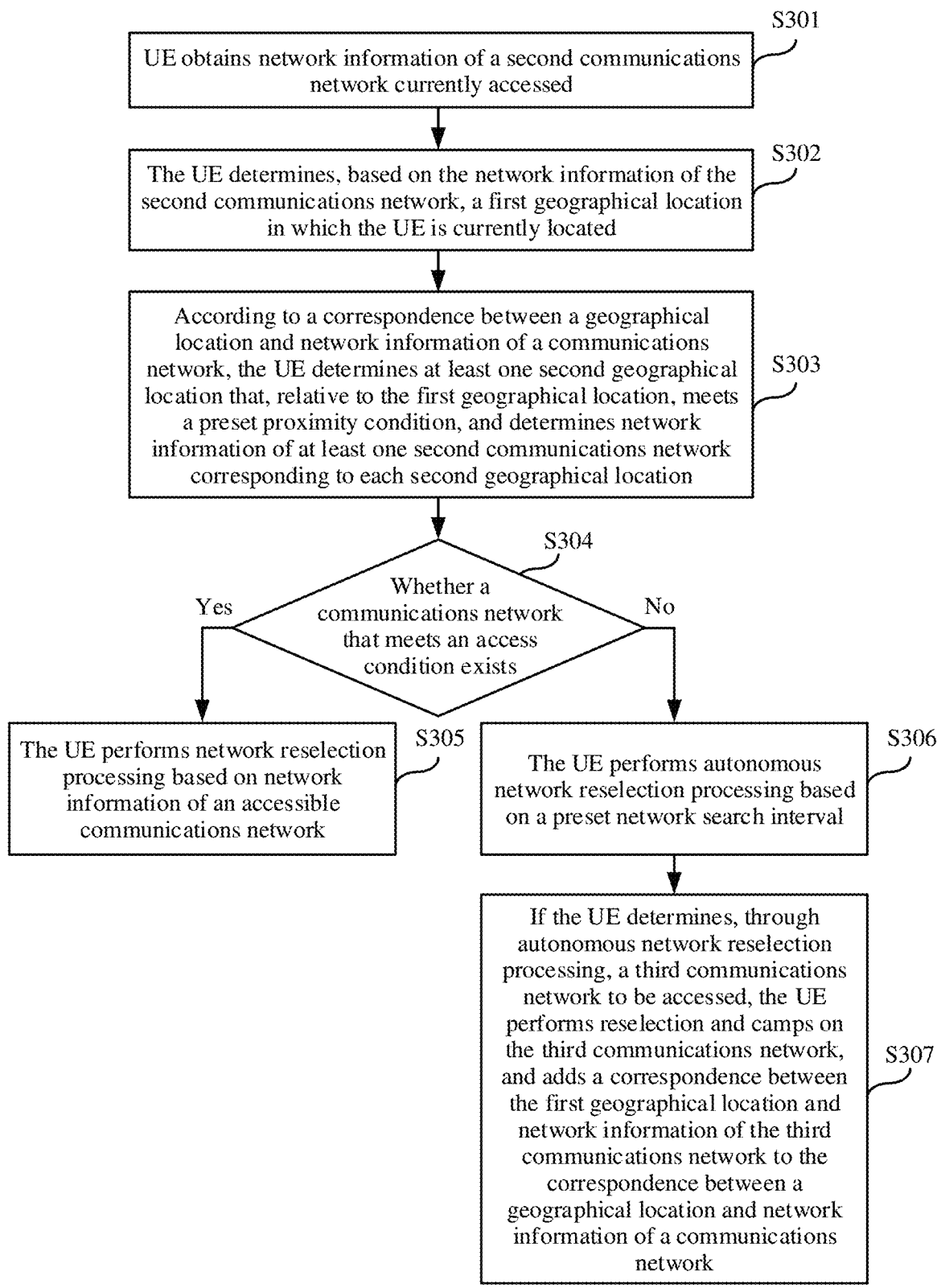
FIG. 3 is a flowchart of an example of a network reselection method according to an embodiment of this application.

This application further provides an example of a network reselection method. As shown in FIG. 3, the example specifically includes the following steps.

Step 301: UE obtains network information of a first communications network currently accessed.

Step 302: The UE determines, based on the network information of the first communications network, a first geographical location in which the UE is currently located.

Step 303: According to a correspondence between a geographical location and network information of a communications network, the UE determines at least one second geographical location that, relative to the first geographical location, meets a preset proximity condition, and determines network information of at least one second communications network corresponding to each second geographical location.

Step 304: Determine whether a communications network that meets an access condition exists in the at least one second communications network corresponding to each second geographical location. If the communications network that meets the access condition exists, step 305 is performed. If the communications network that meets the access condition does not exist, step 306 and step 307 are performed.

Step 305: The UE performs network reselection processing based on network information of an accessible communications network.

Step 306: The UE performs autonomous network reselection processing based on a preset network search interval.

Step 307: If the UE determines, through autonomous network reselection processing, a third communications network to be accessed, the UE performs reselection and camps on the third communications network, and adds a correspondence between the first geographical location and network information of the third communications network to the correspondence between a geographical location and network information of a communications network.

For a specific processing process of step 301 to step 307, refer to the descriptions of step 201 to step 203. Details are not described in this application.

In this application, the first geographical location in which the UE is currently located is obtained. Then, according to the correspondence between a geographical location and network information of a communications network, the at least one second geographical location that, relative to the first geographical location, meets the preset proximity condition is determined, and the network information of the second communications network corresponding to each second geographical location is determined. After that, network reselection processing is performed based on at least the network information of the second communications network corresponding to each second geographical location. In this way, the UE does not need to perform network search processing on all surrounding communications networks, and does not need to measure all to-be-accessed communications networks either, thereby improving network reselection efficiency.

Currently, a positioning database (or referred to as a geographical location database) may obtain related geographical location information by using information about a cell on which UE camps. It may be understood as that the positioning database includes only a correspondence from cell information to geographical location information. On the contrary, in some embodiments provided in this application, a correspondence (or referred to as a mapping relationship) from geographical location information to cell information (belonging to network information of a communications network) may be established. By using the correspondence and based on a geographical location in which UE is located, information about a cell around the geographical location in which the UE is located (for example, a geographical location within a specific distance from the geographical location in which the UE is located) may be obtained, which can help the UE perform service optimization. Specifically, the correspondence may be a table. The table may be understood as a bidirectional table that includes a correspondence from geographical location information to network information of a communications network, and may further include a correspondence from network information of a communications network to geographical location information.

Figure 4:
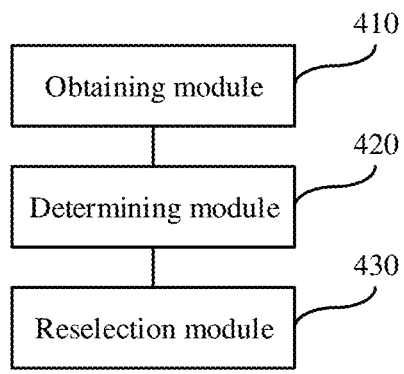
FIG. 4 is a schematic structural diagram of an apparatus according to an embodiment of this application.

Based on the same technical concept, an embodiment of this application further provides an apparatus. As shown in FIG. 4, the apparatus includes:

an obtaining module 410, configured to obtain a first geographical location in which UE is currently located;

a determining module 420, configured to: according to a correspondence between a geographical location and network information of a communications network, determine at least one second geographical location that, relative to the first geographical location, meets a preset proximity condition, and determine network information of at least one second communications network corresponding to each second geographical location, where the network information of a communications network includes at least one or more of a radio access technology and a cell identity; and a reselection module 430, configured to perform network reselection processing based on at least the network information of the at least one second communications network corresponding to each second geographical location.

In a possible implementation, the obtaining module 410 is specifically configured to:
obtain network information of a first communications network currently accessed by the UE; and
determine, based on at least the network information of the first communications network, the first geographical location in which the UE is currently located.

Figure 5:
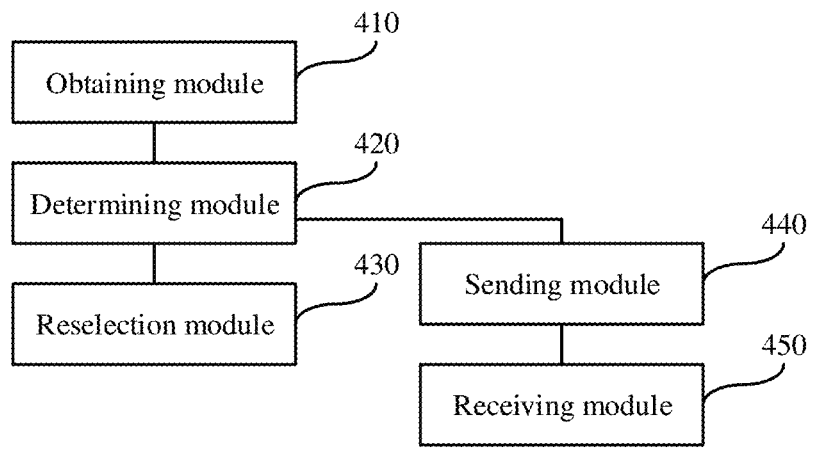
FIG. 5 is a schematic structural diagram of an apparatus according to an embodiment of this application.

In a possible implementation, the correspondence between a geographical location and network information of a communications network is stored in the UE, and as shown in FIG. 5, the apparatus further includes:
a sending module 440, configured to: if the at least one second geographical location that, relative to the first geographical location, meets the preset proximity condition cannot be determined according to the correspondence between a geographical location and network information of a communications network that is stored in the UE, send a query request to a server, where the query request carries the first geographical location, so that according to a correspondence between a geographical location and network information of a communications network that is stored in the server, the server determines at least one third geographical location that, relative to the first geographical location, meets the preset proximity condition, and determines network information of at least one third communications network corresponding to each third geographical location; and
a receiving module 450, configured to receive a query response sent by the server, where the query response carries the network information of the at least one third communications network corresponding to each third geographical location.

In a possible implementation, the reselection module 430 is specifically configured to:
select, from the at least one second communications network corresponding to each second geographical location, at least one fourth communications network that meets a condition, and perform network reselection processing based on network information of the at least one fourth communications network, where the condition is a condition that needs to be met by a communications network that the UE needs to perform reselection and camp on, and the condition is related to one or more of a radio access technology, a public land mobile network PLMN, and signal strength.

In a possible implementation, the reselection module 430 is specifically configured to:
when the UE needs to perform reselection and camp on a communications network using a second radio access technology from a communications network using a first radio access technology, select at least one fourth communications network using the second radio access technology from the at least one second communications network corresponding to each second geographical location, and perform network reselection processing based on network information of the at least one fourth communications network.

In a possible implementation, the reselection module 430 is specifically configured to:
if the UE is in a non-roaming state, select, from the at least one second communications network corresponding to each second geographical location, at least one fourth communications network that belongs to a PLMN to which the UE belongs, and perform network reselection processing based on network information of the at least one fourth communications network; or
if the UE is in a roaming state, select, from the at least one second communications network corresponding to each second geographical location, at least one fourth communications network that belongs to a PLMN to which the UE subscribes, and perform network reselection processing based on network information of the at least one fourth communications network.

In a possible implementation, the reselection module 430 is specifically configured to:
when the UE needs to process an emergency call service, select a fourth communications network with highest signal strength from the at least one second communications network corresponding to each second geographical location, and perform reselection and camp on the fourth communications network to process the emergency call service.

In this application, the first geographical location in which the UE is currently located is obtained. Then, according to the correspondence between a geographical location and network information of a communications network, the at least one second geographical location that, relative to the first geographical location, meets the preset proximity condition is determined, and the network information of the second communications network corresponding to each second geographical location is determined. After that, network reselection processing is performed based on at least the network information of the second communications network corresponding to each second geographical location. In this way, the UE does not need to perform network search processing on all surrounding communications networks, and does not need to measure all to-be-accessed communications networks either, thereby improving network reselection efficiency.

Figure 6:
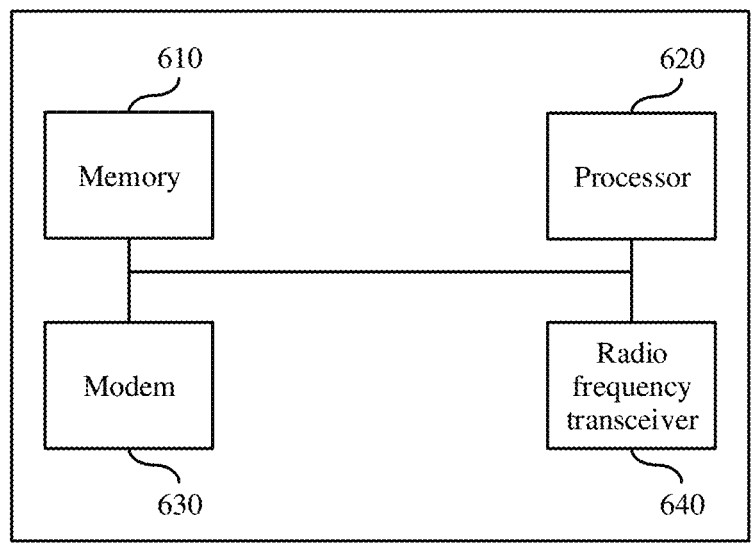
FIG. 6 is a schematic structural diagram of user equipment UE according to an embodiment of this application.

Based on the same technical concept, an embodiment of this application further provides user equipment UE. As shown in FIG. 6, the UE includes one or more memories 610, one or more processors 620, one or more modems 630, and one or more radio frequency transceivers 640, where the radio frequency transceivers 640 may include a radio frequency circuit and an antenna;
the one or more memories 610 are configured to store a program instruction; and
the one or more processors 620 are configured to execute the program instruction stored in the one or more memories 610 to enable the UE to perform the following operations:
obtaining a first geographical location in which the UE is currently located;
according to a correspondence between a geographical location and network information of a communications network, determining at least one second geographical location that, relative to the first geographical location, meets a preset proximity condition, and determining network information of at least one second communications network corresponding to each second geographical location, where the network information of a communications network includes one or more of a radio access technology and a cell identity; and
controlling, by using the one or more modems 630, the one or more radio frequency transceivers 640 to perform network reselection processing based on at least the network information of the at least one second communications network corresponding to each second geographical location.

In a possible implementation, the operation of obtaining a first geographical location in which the UE is currently located includes:
  obtaining, by using the one or more modems 630, network information of a first communications network currently accessed by the UE; and
  determining, based on at least the network information of the first communications network, the first geographical location in which the UE is currently located.

In a possible implementation, the correspondence between a geographical location and network information of a communications network is stored in the one or more memories 610 of the UE, and the operation further includes:
  if the at least one second geographical location that, relative to the first geographical location, meets the preset proximity condition cannot be determined according to the correspondence between a geographical location and network information of a communications network that is stored in the UE, controlling, by using the one or more modems 630, the one or more radio frequency transceivers 640 to send a query request to a server, where the query request carries the first geographical location, so that according to a correspondence between a geographical location and network information of a communications network that is stored in the server, the server determines at least one third geographical location that, relative to the first geographical location, meets the preset proximity condition, and determines network information of at least one third communications network corresponding to each third geographical location; and
  controlling, by using the one or more modems 630, the one or more radio frequency transceivers 640 to receive a query response sent by the server, where the query response carries the network information of the at least one third communications network corresponding to each third geographical location.

In a possible implementation, the operation of controlling, by using the one or more modems 630, the one or more radio frequency transceivers 640 to perform network reselection processing based on at least the network information of the at least one second communications network corresponding to each second geographical location includes:
  selecting, from the at least one second communications network corresponding to each second geographical location, at least one fourth communications network that meets a condition, and controlling, by using the one or more modems 630, the one or more radio frequency transceivers 640 to perform network reselection processing based on network information of the at least one fourth communications network, where the condition is a condition that needs to be met by a communications network that the UE needs to perform reselection and camp on, and the condition is related to one or more of a radio access technology, a public land mobile network PLMN, and signal strength.

In a possible implementation, the operation of selecting, from the at least one second communications network corresponding to each second geographical location, at least one fourth communications network that meets a condition, and controlling, by using the one or more modems 630, the one or more radio frequency transceivers 640 to perform network reselection processing based on network information of the at least one fourth communications network includes:
  when the UE needs to perform reselection and camp on a communications network using a second radio access technology from a communications network using a first radio access technology, selecting at least one fourth communications network using the second radio access technology from the at least one second communications network corresponding to each second geographical location, and controlling, by using the one or more modems 630, the one or more radio frequency transceivers 640 to perform network reselection processing based on network information of the at least one fourth communications network.

In a possible implementation, the operation of selecting, from the at least one second communications network corresponding to each second geographical location, at least one fourth communications network that meets a condition, and controlling, by using the one or more modems 630, the one or more radio frequency transceivers 640 to perform network reselection processing based on network information of the at least one fourth communications network includes:
  if the UE is in a non-roaming state, selecting, from the at least one second communications network corresponding to each second geographical location, at least one fourth communications network that belongs to a PLMN to which the UE belongs, and controlling, by using the one or more modems 630, the one or more radio frequency transceivers 640 to perform network reselection processing based on network information of the at least one fourth communications network; or
  if the UE is in a roaming state, selecting, from the at least one second communications network corresponding to each second geographical location, at least one fourth communications network that belongs to a PLMN to which the UE subscribes, and controlling, by using the one or more modems 630, the one or more radio frequency transceivers 640 to perform network reselection processing based on network information of the at least one fourth communications network.

In a possible implementation, the operation of selecting, from the at least one second communications network corresponding to each second geographical location, at least one fourth communications network that meets a condition, and controlling, by using the one or more modems 630, the one or more radio frequency transceivers 640 to perform network reselection processing based on network information of the at least one fourth communications network includes:
  when the UE needs to process an emergency call service, selecting a fourth communications network with highest signal strength from the at least one second communications network corresponding to each second geographical location, and controlling, by using the one or more modems 630, the one or more radio frequency transceivers 640 to perform reselection and camp on the fourth communications network to process the emergency call service.

In this application, the first geographical location in which the UE is currently located is obtained. Then, according to the correspondence between a geographical location and network information of a communications network, the at least one second geographical location that, relative to the first geographical location, meets the preset proximity condition is determined, and the network information of the second communications network corresponding to each second geographical location is determined. After that, network reselection processing is performed based on at least the network information of the second communications network corresponding to each second geographical location. In this way, the UE does not need to perform network search processing on all surrounding communications networks, and does not need to measure all to-be-accessed communications networks either, thereby improving network reselection efficiency.

Based on the same technical concept, an embodiment of this application further provides a computer readable storage medium, including an instruction. When the instruction is run on a computer, the computer is enabled to perform the network reselection method.

Based on the same technical concept, an embodiment of this application further provides a user terminal, where the user terminal includes one or more processors, one or more memories, one or more modems, and one or more radio frequency transceivers, where
- the one or more memories are configured to store a program instruction; and
- the one or more processors are configured to control the one or more modems and the one or more radio frequency transceivers according to the program instruction stored in the one or more memories, to enable the user terminal to perform the network reselection method.

Based on the same technical concept, an embodiment of this application further provides a user terminal, where the terminal includes one or more processors, one or more memories, and one or more transceivers, where
- the one or more transceivers are configured to receive and send data;
- the one or more memories are configured to store an instruction; and
- the one or more processors are configured to invoke and execute the instruction in the one or more memories, to enable the user terminal to perform the network reselection method.

Based on the same technical concept, an embodiment of this application further provides an apparatus that is used in a user terminal, where the apparatus is coupled to a memory, and is configured to read and execute an instruction stored in the memory, to enable the user terminal to implement the network reselection method; and
- the memory may be integrated into a processor, or may be independent of a processor.

Based on the same technical concept, an embodiment of this application further provides the foregoing apparatus, where the apparatus is a chip (for example, a system on a chip SoC (System on a Chip)) of the user terminal.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A method, comprising:
- obtaining, by a user equipment (UE), a first geographical location in which the UE is currently located;
- determining, according to a correspondence between at least one second geographical location and network information of a first communications network, the at least one second geographical location, wherein each second geographical location of the at least one second geographical location, relative to the first geographical location, meets a preset proximity condition, and wherein the correspondence is stored by the UE;
- determining, by the UE, network information of at least one second communications network corresponding to the at least one second geographical location, wherein the network information of the at least one second communications network comprises, for each second communications network of the at least one second communications network, one or more of a radio access technology or a cell identity; and
- performing, by the UE, network reselection processing based on the network information of the at least one second communications network corresponding to the at least one second geographical location, and camping, by the UE, on the at least one second communications network.

2. The method according to claim 1, wherein obtaining, by the UE, the first geographical location in which the UE is currently located comprises:
- obtaining, by the UE, network information of the first communications network, wherein the UE currently accesses the first communications network; and
- determining, by the UE based on the network information of the first communications network, the first geographical location in which the UE is currently located.

3. The method according to claim 1, wherein performing, by the UE, the network reselection processing based on the network information of the at least one second communications network corresponding to the at least one second geographical location comprises:
- selecting, from the at least one second communications network corresponding to the at least one second geographical location, at least one fourth communications network that meets a condition, and performing, by the UE, network reselection processing based on network information of the at least one fourth communications network, wherein the condition is required by the UE for a communications network that the UE will perform reselection and camp on, and the condition is related to one or more of the radio access technology, a public land mobile network (PLMN), or signal strength.

4. The method according to claim 3, wherein selecting, from the at least one second communications network corresponding to the at least one second geographical location, the at least one fourth communications network that meets the condition, and performing, by the UE, the network reselection processing based on network information of the at least one fourth communications network, comprises:

when the UE performs reselection from a communications network using a first radio access technology to camp on a communications network using a second radio access technology, selecting at least one fourth communications network using the second radio access technology from the at least one second communications network corresponding to the at least one second geographical location, and performing the network reselection processing based on the network information of the at least one fourth communications network.

5. The method according to claim 3, wherein selecting, from the at least one second communications network corresponding to the at least one second geographical location, the at least one fourth communications network that meets the condition, and performing, by the UE, network reselection processing based on network information of the at least one fourth communications network, comprises:

when the UE is in a non-roaming state, selecting, from the at least one second communications network corresponding to the at least one second geographical location, at least one fourth communications network that belongs to a public land mobile network (PLMN) to which the UE belongs, and performing, by the UE, the network reselection processing based on the network information of the at least one fourth communications network; or when the UE is in a roaming state, selecting, from the at least one second communications network corresponding to the at least one second geographical location, at least one fourth communications network that belongs to a PLMN to which the UE subscribes, and performing, by the UE, the network reselection processing based on the network information of the at least one fourth communications network.

6. The method according to claim 3, wherein selecting, from the at least one second communications network corresponding to the at least one second geographical location, the at least one fourth communications network that meets the condition, performing, by the UE, network reselection processing based on network information of the at least one fourth communications network, and camping, by the UE, on the at least one second communications network, comprises:

when the UE needs to process an emergency call service, selecting a fourth communications network with highest signal strength from the at least one second communications network corresponding to the at least one second geographical location, and performing reselection and camping on the fourth communications network to process the emergency call service.

7. The method according to claim 1, further comprising:
processing, by the UE, a service using the at least one second communications network that cannot be processed using the first communications network.

8. User equipment (UE), comprising:
one or more non-transitory memories;
one or more processors;
one or more modems; and
one or more radio frequency transceivers;
wherein the one or more non-transitory memories are configured to store a program instruction; and
wherein the one or more processors are configured to execute the program instruction stored in the one or more non-transitory memories, to cause the UE to:
obtain a first geographical location in which the UE is currently located;
determine, according to a correspondence between at least one second geographical location and network information of a first communications network, the at least one second geographical location, wherein each second geographical location, relative to the first geographical location, meets a preset proximity condition, wherein the correspondence is stored on the UE;
determine network information of at least one second communications network corresponding to the at least one second geographical location, wherein the network information of the at least one second communications network comprises, for each second communications network of the at least one second communications network, one or more of a 'radio access technology or a cell identity;
control, using the one or more modems, the one or more radio frequency transceivers to perform network reselection processing based on the network information of the at least one second communications network corresponding to the at least one second geographical location; and
camp on the at least one second communications network.

9. The UE according to claim 8, wherein obtaining the first geographical location in which the UE is currently located comprises:
obtaining, using the one or more modems, network information of the first communications network, wherein the UE currently accesses the first communications network; and
determining, based on the network information of the first communications network, the first geographical location in which the UE is currently located.

10. The UE according to claim 8, wherein controlling, using the one or more modems, the one or more radio frequency transceivers to perform network reselection processing based on the network information of the at least one second communications network corresponding to the at least one second geographical location comprises:
selecting, from the at least one second communications network corresponding to the at least one second geographical location, at least one fourth communications network that meets a condition, and controlling, using the one or more modems, the one or more radio frequency transceivers to perform network reselection processing based on network information of the at least one fourth communications network, wherein the condition is required by the UE for a communications network that the UE will perform reselection and camp on, and the condition is related to one or more of the radio access technology, a public land mobile network (PLMN), or signal strength.

11. The UE according to claim 10, wherein selecting, from the at least one second communications network corresponding to at least one second geographical location, at least one fourth communications network that meets the condition, and controlling, using the one or more modems, the one or more radio frequency transceivers to perform network reselection processing based on the network information of the at least one fourth communications network comprises:
- when the UE performs reselection from a communications network using a first radio access technology to camp on a communications network using a second radio access technology, selecting at least one fourth communications network using the second radio access technology from the at least one second communications network corresponding to the at least one second geographical location, and controlling, using the one or more modems, the one or more radio frequency transceivers to perform the network reselection processing based on the network information of the at least one fourth communications network.

12. The UE according to claim 10, wherein selecting, from the at least one second communications network corresponding to the at least one second geographical location, at least one fourth communications network that meets the condition, and controlling, using the one or more modems, the one or more radio frequency transceivers to perform network reselection processing based on the network information of the at least one fourth communications network comprises:
- when the UE is in a non-roaming state, selecting, from the at least one second communications network corresponding to the at least one second geographical location, at least one fourth communications network that belongs to a PLMN to which the UE belongs, and controlling, using the one or more modems, the one or more radio frequency transceivers to perform the network reselection processing based on the network information of the at least one fourth communications network; or
- when the UE is in a roaming state, selecting, from the at least one second communications network corresponding to the at least one second geographical location, at least one fourth communications network that belongs to a PLMN to which the UE subscribes, and controlling, using the one or more modems, the one or more radio frequency transceivers to perform the network reselection processing based on the network information of the at least one fourth communications network.

13. The UE according to claim 10, wherein selecting, from the at least one second communications network corresponding to the at least one second geographical location, at least one fourth communications network that meets a condition, and controlling, using the one or more modems, the one or more radio frequency transceivers to perform network reselection processing based on the network information of the at least one fourth communications network, and camping on the at least one second communications network comprises:
- when the UE needs to process an emergency call service, selecting a fourth communications network with highest signal strength from the at least one second communications network corresponding to the at least one second geographical location, and controlling, by using the one or more modems, the one or more radio frequency transceivers to perform reselection and camp on the fourth communications network to process the emergency call service.

14. A non-transitory computer-readable storage medium, comprising an instruction, wherein when the instruction is run on a computer, the computer is caused to perform the following:
- obtaining a first geographical location in which a user equipment (UE) is currently located;
- determining, according to a correspondence between at least one second geographical location and network information of a first communications network, the at least one second geographical location, wherein each second geographical location of the at least one geographical location, relative to the first geographical location, meets a preset proximity condition, wherein the correspondence is stored on the UE;
- determining network information of at least one second communications network corresponding to the at least one second geographical location, wherein the network information of the at least one second communications network comprises, for each second communications network of the at least one second communications network, one or more of a radio access technology or a cell identity; and
- performing network reselection processing based on the network information of the at least one second communications network corresponding to the at least one second geographical location; and
- camping on the at least one second communications network.

15. The non-transitory computer-readable storage medium according to claim 14, wherein when the instruction is run on a computer, the computer is caused to perform the following:
- obtaining network information of the first communications network, wherein the first communications network is currently accessed by the UE; and
- determining, based on the network information of the first communications network, the first geographical location in which the UE is currently located.

16. The non-transitory computer-readable storage medium according to claim 14, wherein when the instruction is run on a computer, the computer is caused to perform the following:
- selecting, from the at least one second communications network corresponding to the at least one second geographical location, at least one fourth communications network that meets a condition, and performing network reselection processing based on network information of the at least one fourth communications network, wherein the condition is required by the UE for a communications network that the UE will perform reselection and camp on, and the condition is related to one or more of the radio access technology, a public land mobile network (PLMN), or signal strength.

17. The non-transitory computer-readable storage medium according to claim 16, wherein when the instruction is run on a computer, the computer is caused to perform the following:
- when the UE perform reselection from a communications network using a first radio access technology to camp on a communications network using a second radio access technology, selecting at least one fourth communications network using the second radio access technology from the at least one second communications network corresponding to the at least one second geographical location, and performing the network reselection processing based on the network information of the at least one fourth communications network.

18. The non-transitory computer-readable storage medium according to claim 16, wherein when the instruction is run on a computer, the computer is caused to perform the following:
- when the UE is in a non-roaming state, selecting, from the at least one second communications network corresponding to the at least one second geographical location, at least one fourth communications network that belongs to a PLMN to which the UE belongs, and performing the network reselection processing based on the network information of the at least one fourth communications network; or
- when the UE is in a roaming state, selecting, from the at least one second communications network corresponding to the at least one second geographical location, at least one fourth communications network that belongs to a PLMN to which the UE subscribes, and performing the network reselection processing based on the network information of the at least one fourth communications network.

\* \* \* \* \*